United States Patent
Kataoka et al.

(10) Patent No.: US 7,596,939 B2
(45) Date of Patent: Oct. 6, 2009

(54) GAS TURBINE APPARATUS

(75) Inventors: Tadashi Kataoka, Ohta-ku (JP);
Nobuhiko Hamano, Ohta-ku (JP)

(73) Assignee: Ebara Corporation, Tokyo (JP)

( * ) Notice: Subject to any disclaimer, the term of this patent is extended or adjusted under 35 U.S.C. 154(b) by 379 days.

(21) Appl. No.: 11/290,480

(22) Filed: Dec. 1, 2005

(65) Prior Publication Data

US 2006/0119202 A1 Jun. 8, 2006

(30) Foreign Application Priority Data

Dec. 3, 2004 (JP) ............................ 2004-351500

(51) Int. Cl.
*F02C 3/28* (2006.01)
*F02C 7/22* (2006.01)
*F02C 9/28* (2006.01)

(52) U.S. Cl. ............... 60/39.281; 60/39.511; 60/39.463

(58) Field of Classification Search ............. 60/39.463, 60/39.511, 39.281
See application file for complete search history.

(56) References Cited

U.S. PATENT DOCUMENTS

| | | | |
|---|---|---|---|
| 4,833,878 A * | 5/1989 | Sood et al. ............... | 60/39.463 |
| 5,934,065 A | 8/1999 | Bronicki et al. | |
| 6,199,366 B1 * | 3/2001 | Murata et al. ................. | 60/785 |
| 6,294,842 B1 * | 9/2001 | Skowronski ................. | 60/776 |
| 6,393,821 B1 * | 5/2002 | Prabhu ..................... | 60/39.465 |
| 6,666,027 B1 * | 12/2003 | Cardenas, Jr. ............ | 60/39.465 |

FOREIGN PATENT DOCUMENTS

| EP | 0 915 242 A2 | 5/1999 |
|---|---|---|
| JP | 62-67241 | 3/1987 |
| JP | 2004-270642 | 9/2004 |
| WO | WO 00/60225 | 10/2000 |

* cited by examiner

*Primary Examiner*—Ted Kim
(74) *Attorney, Agent, or Firm*—Oblon, Spivak, McClelland, Maier & Neustadt, L.L.P.

(57) ABSTRACT

A gas turbine apparatus has an air compressor for compressing air, a combustor capable of combusting the compressed air, a turbine rotatable by a gas discharged from the combustor, and a recuperator for exchanging heat between the air supplied from the air compressor and an exhaust gas discharged from the turbine. The gas turbine apparatus includes a fuel supply system having a first fuel supply device for supplying a fuel having a large heating value to the combustor, a second fuel supply device for supplying a gas having a small heating value to the combustor, and a switching device operable to switch the first fuel supply device and the second fuel supply device based on a temperature of the air compressed by the air compressor or the exhaust gas discharged from the turbine.

24 Claims, 4 Drawing Sheets

GAS TURBINE APPARATUS

BACKGROUND OF THE INVENTION

1. Field of the Invention

The present invention relates to a gas turbine apparatus, and more particularly to a gas turbine apparatus used in a micro-gas turbine power generating system or the like. The present invention also relates to a gas turbine power generating system employing such a gas turbine apparatus to generate electric power.

2. Description of the Related Art

For example, a digestion gas mainly containing methane is produced in a digestion process of biomass, and a pyrolysis gas mainly containing carbon monoxide, hydrogen, and hydrocarbon is produced in a gasification process of biomass. Such gases have a small heating value per unit volume. While a town gas has a lower heating value of about 50,233 kJ/kg (12,000 kcal/kg), a digestion gas has a lower heating value of about 25,116 kJ/kg (6,000 kcal/kg), which is a half of the lower heating value of the town gas. A pyrolysis gas has a lower heating value of about 5,023 kJ/kg (1,200 kcal/kg), which is a tenth of the lower heating value of the town gas.

Ratios of combustible components vary in gases having a small heating value, which are produced from biomass, according to places, seasons, or time. The heating values of these gases are accordingly changed. Generally, as the lower heating value of a fuel gas is smaller, the fuel gas is less likely to be ignited and to be stably combusted. Particularly, gases having a lower heating value smaller than about 6,279 kJ/kg (1,500 kcal/kg) have difficulty in maintaining combustion in a heat engine such as a gas turbine or a gas engine.

Accordingly, as a fuel gas has a smaller heating value, it is more difficult to ignite the fuel gas in a heat engine such as a gas turbine or a gas engine and start the heat engine reliably. Particularly, in a gas turbine apparatus having a recuperator, a combustion temperature is slowly increased at the beginning of operation because the recuperator has a large heat capacity. Accordingly, it is difficult to reliably start the gas turbine apparatus with use of a gas having a small heating value.

Recently, the following attempts have been made to utilize a gas having a small heating value in a heat engine such as a gas turbine or a gas engine. A gas having a small heating value is refined to a high degree to increase its heating value. Alternatively, a gas having a small heating value is mixed with a fuel gas having a large heating value such as a propane gas. However, these systems have a poor investment efficiency and have not widely spread. Accordingly, most of a digestion gas and a pyrolysis gas are incinerated in practical use even though they have a relatively large heating value.

SUMMARY OF THE INVENTION

The present invention has been made in view of the above drawbacks. It is, therefore, a first object of the present invention to provide a gas turbine apparatus which can stably combust a gas having a small heating value that has been difficult to utilize with a compact structure at a low cost.

A second object of the present invention is to provide a gas turbine power generating system which can stably combust a gas having a small heating value that has been difficult to utilize to generate electric power at a high efficiency with energy of the gas.

According to a first aspect of the present invention, there is provided a gas turbine apparatus which can stably combust a gas having a small heating value that has been difficult to utilize with a compact structure at a low cost. The gas turbine apparatus has an air compressor for compressing air, a combustor capable of combusting the air compressed by the air compressor, a turbine rotatable by a gas discharged from the combustor, and a recuperator for exchanging heat between the air supplied from the air compressor to the combustor and an exhaust gas discharged from the turbine. The gas turbine apparatus includes a first fuel supply device operable to supply a fuel having a large heating value to the combustor, a second fuel supply device operable to supply a gas having a lower heating value smaller than the fuel to the combustor, and a switching device operable to switch the first fuel supply device and the second fuel supply device based on a temperature of the air compressed by the air compressor or the exhaust gas discharged from the turbine.

With the above arrangement, the recuperator can be preheated by supply of the fuel when the gas turbine apparatus is started. Then, operation with the fuel can be switched to operation with the gas. At that time, the gas supplied to the combustor is activated by a high-temperature atmosphere in the combustor. Thus, the gas has a larger combustible range as compared to a case where the gas is under an ordinary temperature atmosphere. As a result, the gas is readily ignited. According to the present invention, it is possible to reliably start the gas turbine apparatus and stably combust a gas having a small heating value that has been difficult to utilize.

In this case, the gas turbine apparatus may have a first temperature measuring device for measuring a temperature of the exhaust gas downstream of the recuperator, a second temperature measuring device for measuring a temperature of the air upstream of the combustor, or a third temperature measuring device for measuring a temperature of the air upstream of the combustor. The switching device may be configured to switch the first fuel supply device and the second fuel supply device when the temperature measured by the first temperature measuring device, the second temperature measuring device, or the third temperature measuring device exceeds a predetermined value.

The gas turbine apparatus may include at least one fuel compressor for pressurizing the fuel at a downstream side of the switching device or at least one fuel compressor for pressurizing the gas at an upstream side of the switching device. The gas turbine apparatus may also include a controller operable to control the amount of discharge from the at least one fuel compressor. A plurality of fuel compressors may be provided in the gas turbine apparatus. In this case, it is desirable that the gas turbine apparatus includes a controller operable to control the number of the plurality of fuel compressors being operated.

The switching device may comprise a three-way mixing valve operable to gradually mix the fuel and the gas and switch the fuel and the gas or a three-way selector valve operable to instantaneously switch the fuel and the gas.

According to a second aspect of the present invention, there is provided a gas turbine apparatus which can stably combust a gas having a small heating value that has been difficult to utilize with a compact structure at a low cost. The gas turbine apparatus has an air compressor for compressing air, a combustor capable of combusting the air compressed by the air compressor, a turbine rotatable by a gas discharged from the combustor, and a recuperator for exchanging heat between the air supplied from the air compressor to the combustor and an exhaust gas discharged from the turbine. The gas turbine apparatus includes a first fuel supply device operable to supply a fuel having a large heating value to the combustor, a second fuel supply device operable to supply a gas having a lower heating value smaller than the fuel to the combustor, and a fuel controller operable to adjust amounts of the fuel and the gas to be supplied.

The gas having a small heating value may have a lower heating value of 25,116 kJ/kg (6000 kcal/kg) or less. For example, a digestion gas produced in a digestion process of biomass or a pyrolysis gas produced in a gasification process of biomass can be employed as the gas having a small heating value. At least one of a natural gas, a liquefied petroleum gas, a propane gas, kerosene, and light oil can be employed as the fuel having a large heating value.

According to a third aspect of the present invention, there is provided a gas turbine power generating system which can stably combust a gas having a small heating value that has been difficult to utilize to generate electric power at a high efficiency with energy of the gas. The gas turbine power generating system has the aforementioned gas turbine apparatus and a power generating apparatus for generating electric power with use of high-speed rotation of the turbine in the gas turbine apparatus. According to the present invention, a gas having a small heating value that has been difficult to utilize can be stably combusted without pressurization to generate electric power at a high efficiency with energy of the gas.

The power generating apparatus may include a permanent magnet power generator coupled to the turbine in the gas turbine apparatus, a converter for converting a high-frequency AC output of the permanent magnet power generator into a DC output, and an inverter for converting the DC output into an AC output having a predetermined frequency and a predetermined voltage and outputting the AC output.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
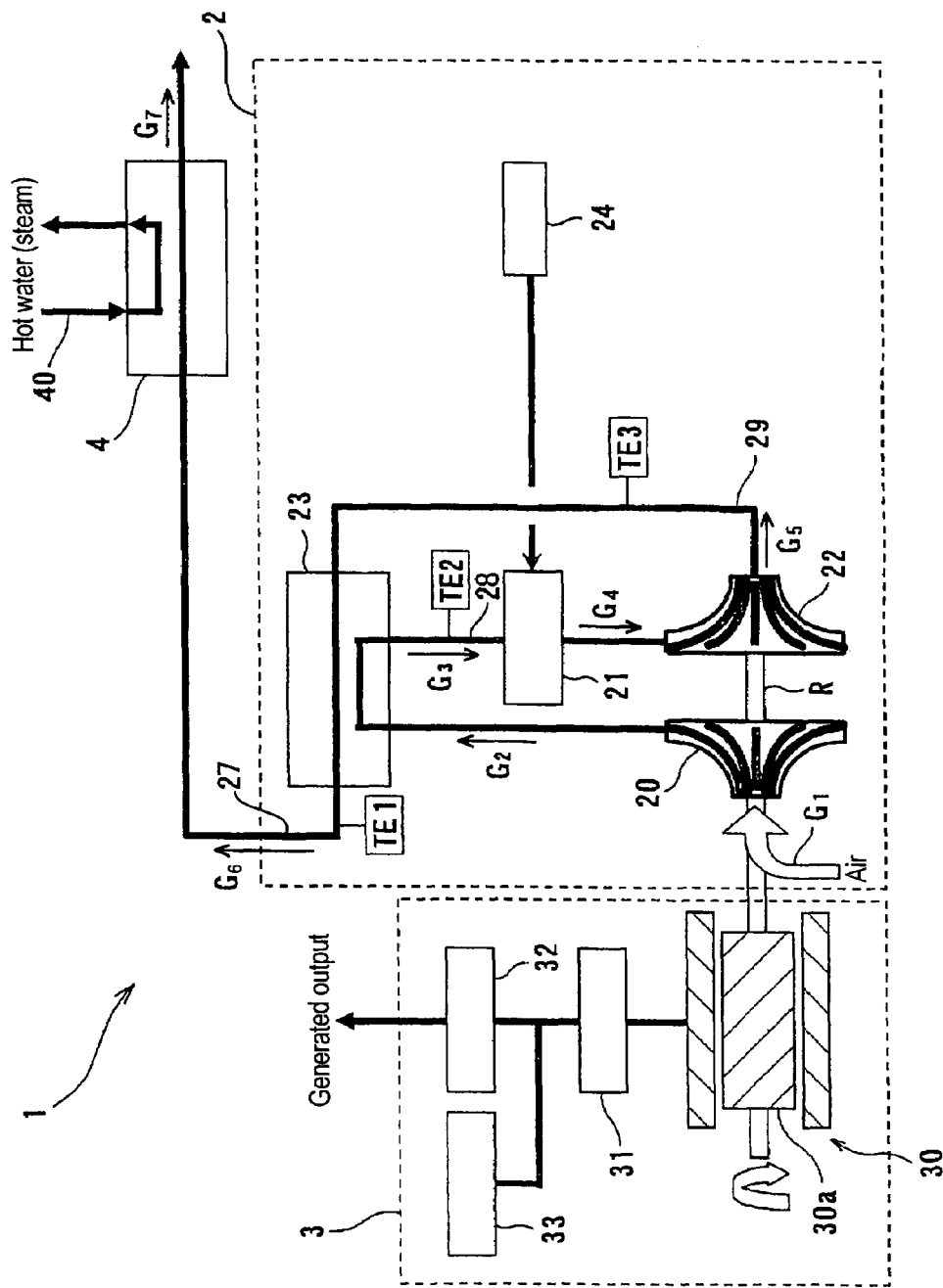
FIG. 1 is a block diagram showing a gas turbine power generating system according to an embodiment of the present invention.

An embodiment of a gas turbine power generating system according to the present invention will be described below with reference to FIGS. 1 through 4. Like or corresponding parts are denoted by like or corresponding reference numerals throughout drawings, and will not be described below repetitively.

FIG. 1 is a block diagram showing a gas turbine power generating system 1 according to an embodiment of the present invention. As shown in FIG. 1, the gas turbine power generating system 1 has a gas turbine apparatus 2 for combusting a gaseous mixture of compressed air and a fuel gas, a power generating apparatus 3 for generating electric power with use of high-speed rotation of a turbine in the gas turbine apparatus 2, and an exhaust heat recovery apparatus 4 for recovering exhaust heat from an exhaust gas discharged from the gas turbine apparatus 2.

The gas turbine apparatus 2 includes an air compressor 20 for compressing air, a combustor 21 for mixing and combusting the air compressed by the air compressor 20 and a fuel, a turbine 22 having a plurality of rotational blades, which are rotated at a high speed by a combustion gas discharged from the combustor 21, and a recuperator (heat exchanger) 23 for superheating the compressed air to be supplied to the combustor 21 with use of exhaust heat of an exhaust gas discharged from the turbine 22. The gas turbine apparatus 2 also includes a fuel supply system 24 for supplying a fuel to the combustor 21.

The power generating apparatus 3 has a power generator 30 coupled directly to a rotation shaft R of the turbine 22, a converter 31 for converting a high-frequency AC output of the power generator 30 into a DC output, an inverter 32 for converting the output of the converter 31 into an AC output having a predetermined frequency and a predetermined voltage, and a battery 33 for driving the power generator 30 so as to serve as a starter motor when operation of the gas turbine apparatus 2 is started. In the present embodiment, a permanent magnet power generator (PMG) is used as the power generator 30, and a pulse width modulation inverter (PWM) is used as the inverter 32.

In the gas turbine power generating system 1 thus constructed, air $G_1$ is drawn into the air compressor 20 and compressed therein. The compressed air $G_2$ has a temperature of about 200° C. and is supplied to the recuperator 23. When the compressed air $G_2$ passes through the recuperator 23, it is superheated by heat of an exhaust gas discharged from the turbine 22. The heated air $G_3$ has a temperature of about 550° C. The compressed air $G_3$ is supplied into the combustor 21 and mixed with a fuel supplied from the fuel supply system 24. Thus, a gaseous mixture of the compressed air $G_3$ and the fuel is formed within the combustor 21. The gaseous mixture of the compressed air $G_3$ and the fuel is combusted in the combustor 21 to produce a combustion gas $G_4$ having a high pressure and a high temperature of about 900° C.

The combustion gas $G_4$ produced by combustion in the combustor 21 is supplied to the turbine 22. The turbine 22 receives the combustion gas $G_4$ and thus rotates at a high speed of, for example, about 68,000 rpm. Since the rotation shaft R of the turbine 22 is connected to the air compressor 20 and a rotor 30a of the power generator 30, the power generator 30 and the air compressor 20 are rotated at a high speed according to the high-speed rotation of the turbine 22. Thus, the air $G_1$ is compressed by the air compressor 20, and an AC current is generated by the power generator 30.

A high-frequency AC current having a frequency of, for example, about 2,000 Hz is generated in the power generator 30 and rectified into a DC current in the converter 31 of the power generating apparatus 3. The output from the converter 31 is converted into an AC current having a predetermined frequency (e.g., 50 Hz or 60 Hz) and a predetermined voltage by the inverter 32 so that it can be used as a commercial AC current and then externally outputted.

The turbine 22 and the recuperator 23 are directly interconnected by an exhaust gas pipe 29. The exhaust gas $G_5$ discharged from the turbine 22 passes through the exhaust gas pipe 29 into the recuperator 23. The exhaust gas $G_5$ supplied into the recuperator 23 exchanges heat with the compressed air $G_2$ flowing through a pipe in the recuperator 23 to superheat the compressed air $G_2$. The exhaust gas $G_6$ discharged from the recuperator 23 is supplied into the exhaust heat recovery apparatus 4.

For example, the exhaust heat recovery apparatus 4 includes a hot water boiler for exchanging heat between the exhaust gas $G_6$ discharged from the recuperator 23 and hot water. The exhaust heat recovery apparatus 4 heats hot water circulated through a hot water pipe 40 with heat of the exhaust gas $G_6$ discharged from the recuperator 23 so as to recover exhaust heat of the exhaust gas $G_6$. The exhaust gas $G_7$ that has exchanged heat with the hot water in the exhaust heat recovery apparatus 4 is then discharged to the exterior of the system.

The recuperator 23 and the exhaust heat recovery apparatus 4 are directly interconnected by an exhaust gas pipe 27. A first temperature measuring device TE1 for measuring the temperature of the exhaust gas $G_6$ downstream of the recuperator 23 is provided on the exhaust gas pipe 27 between the recuperator 23 and the exhaust heat recovery apparatus 4. The recuperator 23 and the combustor 21 are directly interconnected by a compressed air pipe 28. A second temperature measuring device TE2 for measuring the temperature of the compressed air $G_3$ upstream of the combustor 21 is provided on the compressed air pipe 28 between the recuperator 23 and the combustor 21. A third temperature measuring device TE3 for measuring the temperature of the exhaust gas $G_5$ is provided on the exhaust gas pipe 29 between the turbine 22 and the recuperator 23.

Figure 2:
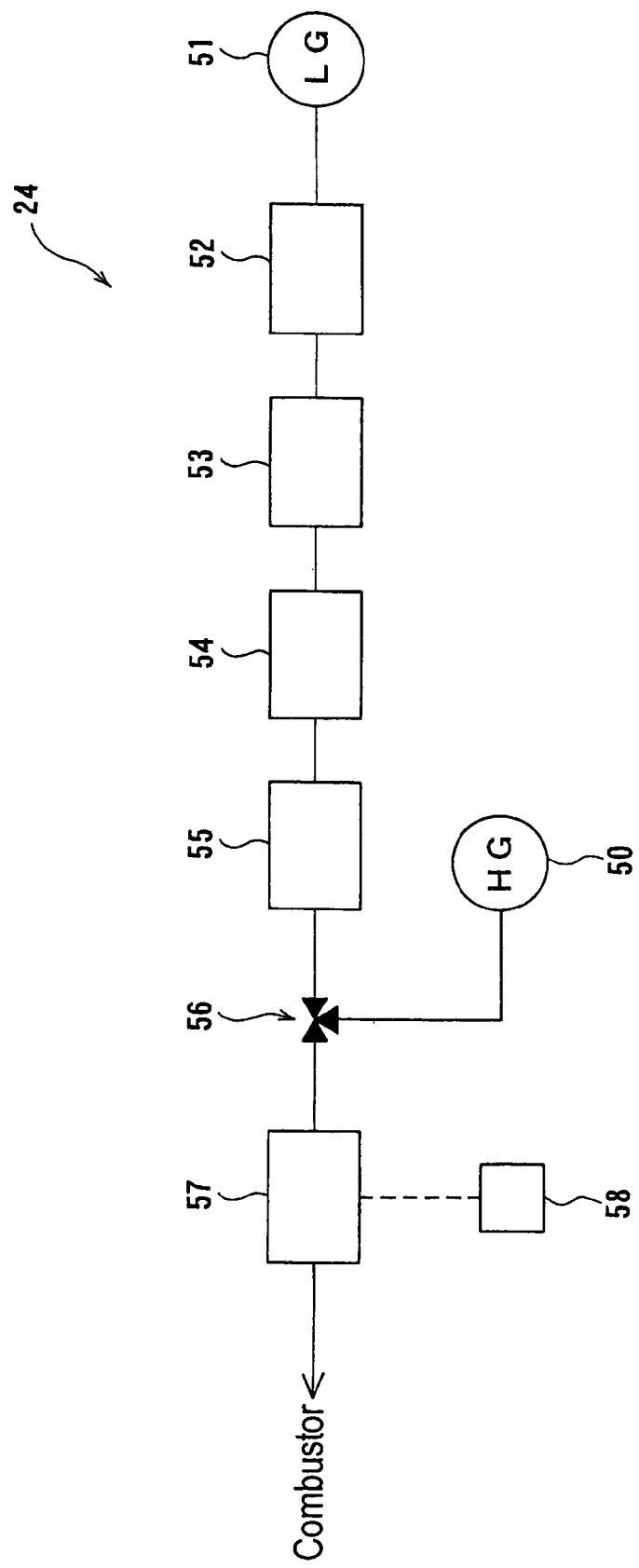
FIG. 2 is a block diagram showing a fuel supply system in the gas turbine power generating system shown in FIG. 1.

FIG. 2 is a block diagram showing the fuel supply system 24. As shown in FIG. 2, the fuel supply system 24 has a supply source 50 (first fuel supply device) for supplying a fuel HG having a large heating value (auxiliary fuel), such as a liquefied natural gas (LNG), a liquefied petroleum gas (LPG), a propane gas, kerosene, or light oil. The fuel supply system 24 also has a supply source 51 (second fuel supply device) for supplying a gas LG having a small heating value, such as a sewage digestion gas produced in a digestion process of biomass or a pyrolysis gas produced in a gasification process of biomass.

The fuel supply system 24 includes a desulfurization tower 52 for removing hydrogen sulfide from the gas LG, a gas blower 53 for pressurizing the gas LG, a dehumidifier 54 for removing moisture from the gas LG, and a siloxane removal device 55 for removing siloxane that has not been removed by the desulfurization tower 52 from the gas LG. Further, the fuel supply system 24 also includes a three-way valve 56 as a switching device for selectively supplying the fuel HG from the first fuel supply device 50 or the gas LG from the second fuel supply device 51 to the combustor 21. The fuel supply system 24 has a fuel compressor 57 disposed downstream of the three-way valve 56 for pressurizing the fuel to a predetermined pressure. The three-way valve 56 may comprise a three-way mixing valve having an actuator or a three-way selector valve having an actuator.

The gas LG having a small heating value, such as a sewage digestion gas or a pyrolysis gas, contains hydrogen sulfide, which may have an adverse influence of corrosion on the subsequent siloxane removal device 55, fuel compressor 57, or turbine 22. Accordingly, the gas LG is supplied from the supply source 51 into the desulfurization tower 52 and desulfurized so as to have a hydrogen sulfide concentration lower than 10 ppm. The desulfurization tower 52 may employ dry desulfurization using iron oxide or wet desulfurization such as biological desulfurization. Siloxane passes through the desulfurization tower 52 because it is not removed from the gas LG in the desulfurization tower 52.

The gas LG that has passed through the desulfurization tower 52 is pressurized by the gas blower 53 so as to have a pressure lower than 0.1 MPaG. Then, the gas LG is cooled and dehumidified by the dehumidifier 54. The gas LG is introduced from the dehumidifier 54 into the siloxane removal device 55, where siloxane is removed from the gas LG. Thereafter, the gas LG passes through the three-way valve 56. Then, the gas LG is pressurized by the fuel compressor 57 so as to have a pressure ranging from 0.5 to 0.6 MPaG. The gas LG is supplied from the fuel compressor 57 to the turbine 22.

When operation of the gas turbine apparatus 2 is started, the three-way valve 56 is switched to the first fuel supply device 50 so as to supply the fuel HG into the combustor 21. At that time, the power generator 30 is used as a drive unit to rotate the turbine 22. Thus, the rotational speed of the turbine 22 is increased to a self-sustaining speed only by supply of the fuel HG Since the fuel HG having a large heating value, such as natural gas or propane gas, can reliably be ignited at an ordinary temperature, the turbine 22 can reliably be started by supplying the fuel HG when operation of the gas turbine apparatus 2 is started.

As described above, a three-way mixing valve or a three-way selector valve may be used as the three-way valve 56. In the case where a three-way mixing valve is used as the three-way valve 56, the three-way mixing valve is slowly operated so as to gradually mix the gas LG into the fuel HG The supply of the fuel HG is finally stopped so that the gas turbine apparatus 2 is operated only with the gas LG. Further, when the volume of pipes from the three-way valve 56 to the combustor 21 is large, the switching from the fuel HG to the gas LG is smoothly conducted even if the three-way valve 56 is switched at a sufficiently high speed. In such a case, a three-way selector valve which can be instantaneously switched may be used as the three-way valve 56. In this case, two two-way solenoid valves may be substituted for the three-way selector to reduce the cost for the gas turbine apparatus 2.

After the rotational speed of the turbine 22 reaches a self-sustaining speed, warm-up is performed until the temperatures of the turbine 22 and the recuperator 23 are increased to desired values. Particularly, since the recuperator 23, which performs heat exchange between the compressed air and the exhaust gas from the turbine 22, has a large heat capacity, it may take several minutes to heat the recuperator 23 to a desired temperature. It can be determined whether or not a unit including the recuperator 23 is heated to a desired temperature based on a temperature of the exhaust gas $G_6$ downstream of the recuperator 23, which is measured by the temperature measuring device TE1, a temperature of the compressed air $G_3$ upstream of the combustor 21, which is measured by the temperature measuring device TE2, or a temperature of the exhaust gas $G_5$ discharged from the turbine 22, which is measured by the temperature measuring device TE3.

After the temperature of the unit including the recuperator 23 reaches the desired temperature, the three-way valve 56 is switched to the second fuel supply device 51 so as to supply the gas LG to the combustor 21. At that time, in the gas turbine apparatus 2, the temperature of the compressed air $G_3$ upstream of the combustor 21 reaches about 550° C., and the interior of the combustor 21 reaches about 1000° C. Accordingly, the gas LG supplied to the combustor 21 is activated by a high-temperature atmosphere in the combustor 21. Thus, the gas LG has a larger combustible range as compared to a case where the gas LG is under an ordinary temperature atmosphere. As a result, the gas LG is readily ignited. According to experiments, even a gas having a lower heating value smaller than 4186 kJ/kg (1000 kcal/kg) could be ignited.

When the gas turbine apparatus 2 is restarted after it has been stopped after operation, the temperature of the compressed air $G_3$ is readily increased to a desired temperature because the combustor 21 and the recuperator 23 have a high temperature. Accordingly, in this case, the three-way valve 56 can be switched from the first fuel supply device 50 to the second fuel supply device 51 before the rotational speed of the turbine 22 reaches a self-sustaining speed. Alternatively, the gas turbine apparatus 2 can be started with only the gas LG without the fuel HG.

The amount of fuel supplied by the fuel supply system 24 should be adjusted according to the heating value of the fuel and the output of the turbine 22. Accordingly, as shown in FIG. 2, it is desirable that the fuel supply system 24 has a controller 58 for controlling the amount of fuel discharged from the fuel compressor 57. Although only one fuel compressor 57 is provided in the example shown in FIG. 2, a plurality of fuel compressors 57 may be provided according to the heating value of the gas LG When a plurality of fuel compressors 57 are provided, it is desirable to provide a controller for controlling the number of the fuel compressors 57 being operated so as to adjust the amount of fuel discharged from the fuel compressor 57.

Figure 3:
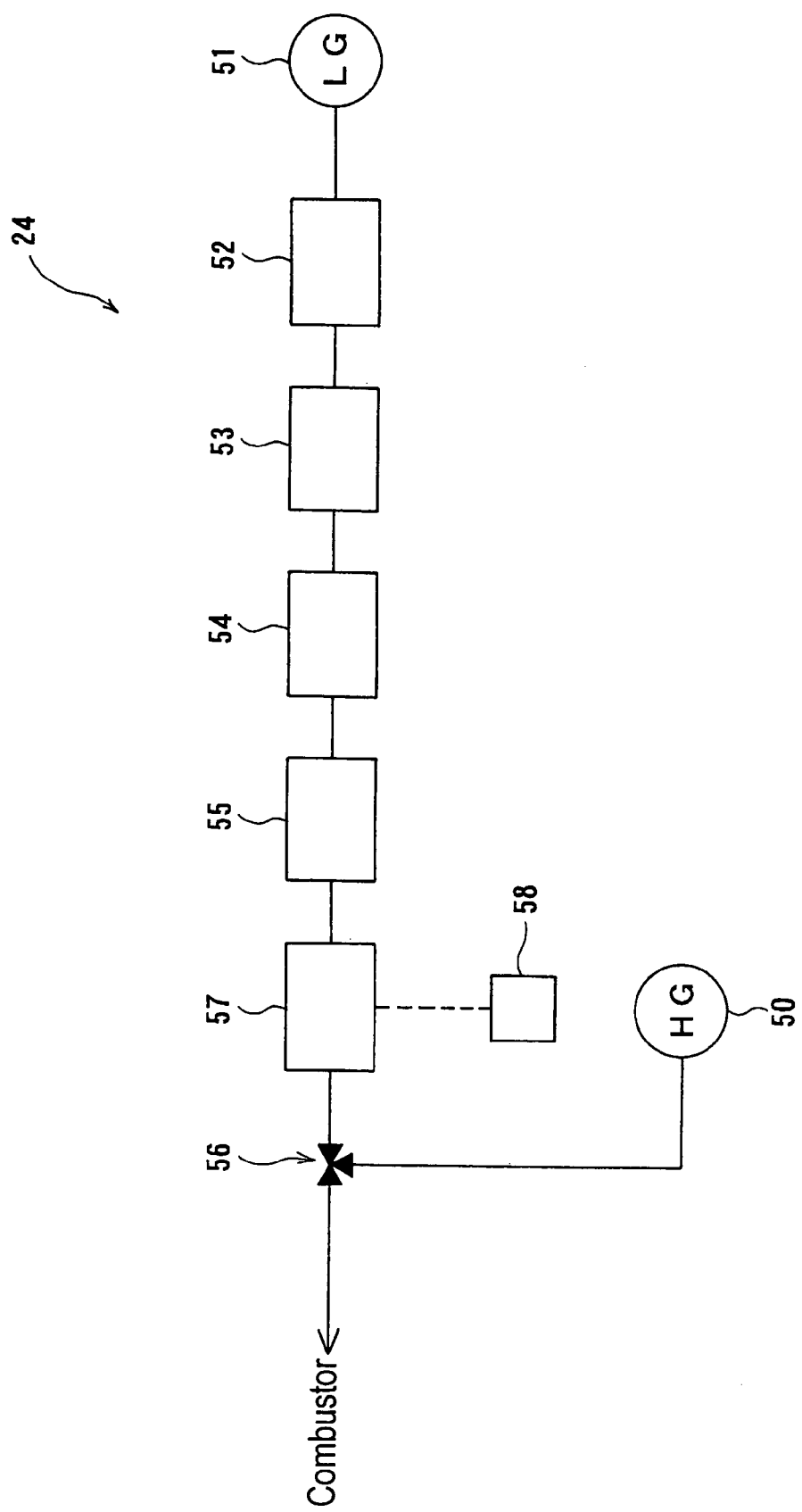
FIG. 3 is a block diagram showing a variation of the fuel supply system shown in FIG. 2.

In the example shown in FIG. 2, the three-way valve 56 is provided upstream of the fuel compressor 57, and the fuel HG is supplied from an upstream side of the fuel compressor 57, i.e., from a suction side of the fuel compressor 57. However, the present invention is not limited to this example. For example, as shown in FIG. 3, the three-way valve 56 may be provided downstream of the fuel compressor 57, and the fuel HG may be supplied from a downstream side of the fuel compressor 57, i.e., from a discharge side of the fuel compressor 57. In this case, the fuel HG should be supplied to the three-way valve 56 after a pressure of the fuel HG is adjusted so as to be substantially equal to a pressure of the gas LG discharged from the fuel compressor 57. For this purpose, the fuel HG having a pressure higher than that of the gas LG may be decompressed and then supplied to the three-way valve 56. For example, a town gas may be supplied to the three-way valve 56 from an intermediate-pressure line or a high-pressure line via a pressure reducing valve (not shown) for reducing the pressure of the town gas. Alternatively, a natural gas may be supplied to the three-way valve 56 from a high-pressure natural gas cylinder via a pressure reducing valve (not shown) for reducing the pressure of the natural gas. A liquefied propane gas may be heated, pressurized, and supplied to the three-way valve 56.

Figure 4:
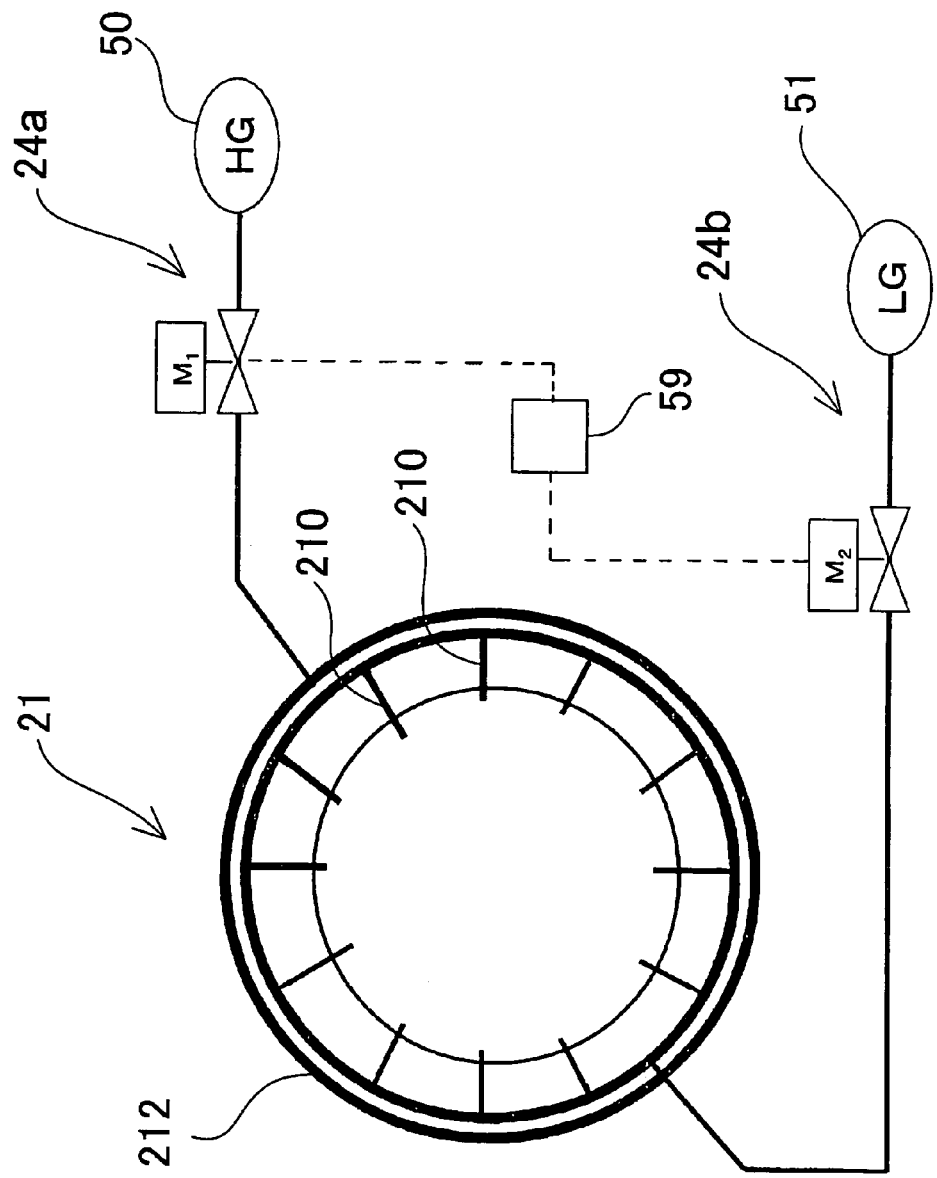
FIG. 4 is a block diagram showing another variation of the fuel supply system shown in FIG. 2.

Further, in the above embodiment, the mixing or switching of the fuel HG and the gas LG is conducted in the fuel supply system 24. However, the present invention is not limited to this example. For example, the first fuel supply device 50 for the fuel HG and the second fuel supply device 51 for the gas LG may be individually connected as separate lines to the combustor 21. FIG. 4 is a block diagram showing an example in which a first fuel supply system 24a for the fuel HG and a second fuel supply system 24b for the gas LG are provided as separate lines.

In the example shown in FIG. 4, the first fuel supply system 24a includes a flow control valve $M_1$ for controlling a flow rate of the fuel HG to be supplied to the combustor 21. The second fuel supply system 24b includes a flow control valve $M_2$ for controlling a flow rate of the gas LG to be supplied to the combustor 21. A fuel controller 59 is provided for controlling the flow control valves $M_1$ and $M_2$ so as to adjust the amounts of fuel HG and gas LG to be supplied to the combustor 21. In this example, the combustor 21 includes a fuel manifold 212 having a plurality of fuel nozzles 210.

The fuel HG is supplied to the combustor 21 until the rotational speed of the turbine 22 reaches a self-sustaining speed. Then, the fuel controller 59 gradually closes the flow control valve $M_1$ of the first fuel supply system 24a while the fuel controller 59 automatically controls the flow control valve $M_2$ for the gas LG. Thus, the fuel controller 59 switches from the fuel HG to the gas LG. In this case, while the temperature of the exhaust gas discharged from the turbine 22 is monitored after the turbine 22 is started by the supply of the fuel HG, the flow control valves $M_1$ and $M_2$ of the fuel supply systems 24a and 24b can be controlled so as to supply the gas LG and the fuel HG at a desired ratio. Further, operation with the fuel HG can be switched to operation with the gas LG by gradually closing the flow control valve $M_1$ and gradually opening the flow control valve $M_2$.

A liquid fuel such as kerosene or light oil can also be used as the fuel HG instead of a gas. In this case, it is desirable to provide an additional flow control valve and a combustion burner for a liquid fuel HG in addition to a flow control valve and a combustion burner for a gas LG. As with the above example, a liquid fuel HG is supplied to the combustor 21 to start the gas turbine apparatus 2. Operation with the liquid fuel HG is switched to operation with the gas LG when a temperature of the exhaust gas $G_6$ downstream of the recuperator 23, a temperature of the compressed air $G_3$ upstream of the combustor 21, or a temperature of the exhaust gas $G_5$ discharged from the turbine 22 reaches a predetermined value.

Although certain preferred embodiments of the present invention have been shown and described in detail, it should be understood that various changes and modifications may be made therein without departing from the scope of the appended claims.

What is claimed is:

1. A gas turbine apparatus comprising:
   an air compressor for compressing air; a combustor capable of combusting the air compressed by said air compressor;
   a turbine rotatable by a gas discharged from said combustor;
   a recuperator for exchanging heat between the air supplied from said air compressor to said combustor and an exhaust gas discharged from said turbine;
   a first fuel supply device operable to supply a fuel having a large heating value to said combustor;
   a second fuel supply device operable to supply a gas having a lower heating value smaller than the fuel to said combustor; and
   a switching device operable to switch a fuel to be supplied to said combustor from the fuel having a large heating value to the gas having a lower heating value by switching said first fuel supply device and said second fuel supply device,
   wherein a switching operation of said switching device is performed when it is determined that said recuperator is heated to a predetermined temperature based on a temperature of the air compressed by said air compressor or the exhaust gas discharged from said turbine.

2. The gas turbine apparatus as recited in claim 1, further comprising a first temperature measuring device for measuring a temperature of the exhaust gas downstream of said recuperator,
   wherein said switching device is configured to switch said first fuel supply device and said second fuel supply device when the temperature measured by said first temperature measuring device exceeds a predetermined value.

3. The gas turbine apparatus as recited in claim 1, further comprising a second temperature measuring device for measuring a temperature of the air upstream of said combustor and downstream of said recuperator,
   wherein said switching device is configured to switch said first fuel supply device and said second fuel supply device when the temperature measured by said second temperature measuring device exceeds a predetermined value.

4. The gas turbine apparatus as recited in claim 1, further comprising a third temperature measuring device for measuring a temperature of the exhaust gas discharged from said turbine,
wherein said switching device is configured to switch said first fuel supply device and said second fuel supply device when the temperature measured by said third temperature measuring device exceeds a predetermined value.

5. The gas turbine apparatus as recited in claim 1, further comprising at least one fuel compressor for pressurizing the fuel at a downstream side of said switching device.

6. The gas turbine apparatus as recited in claim 5, further comprising a controller operable to control an amount of discharge from said at least one fuel compressor.

7. The gas turbine apparatus as recited in claim 5, wherein said at least one fuel compressors comprises a plurality of fuel compressors.

8. The gas turbine apparatus as recited in claim 7, further comprising a controller operable to control a number of said plurality of fuel compressors being operated.

9. The gas turbine apparatus as recited in claim 1, further comprising at least one fuel compressor for pressurizing the gas at an upstream side of said switching device.

10. The gas turbine apparatus as recited in claim 9, further comprising:
a supply source holding the fuel at a pressure higher than a pressure of the gas to be pressurized by said at least one fuel compressor; and
a pressure reducing valve for reducing the pressure of the fuel in said supply source and supplying to said switching device.

11. The gas turbine apparatus as recited in claim 9, further comprising a controller operable to control an amount of discharge from said at least one fuel compressor.

12. The gas turbine apparatus as recited in claim 9, wherein said at least one fuel compressors comprises a plurality of fuel compressors.

13. The gas turbine apparatus as recited in claim 12, further comprising a controller operable to control a number of said plurality of fuel compressors being operated.

14. The gas turbine apparatus as recited in claim 1, wherein said switching device comprises a three-way mixing valve operable to gradually mix the fuel and the gas and switch the fuel and the gas.

15. The gas turbine apparatus as recited in claim 1, wherein said switching device comprises a three-way selector valve operable to instantaneously switch the fuel and the gas.

16. The gas turbine apparatus as recited in claim 1, wherein the gas comprises at least one of a digestion gas produced in a digestion process of biomass and a pyrolysis gas produced in a gasification process of biomass.

17. The gas turbine apparatus as recited in claim 1, wherein the fuel comprises at least one of a natural gas, a liquefied petroleum gas, a propane gas, kerosene, and light oil.

18. A gas turbine apparatus comprising:
an air compressor for compressing air;
a combustor capable of combusting the air compressed by said air compressor, said combustor including a fuel manifold;
a turbine rotatable by a gas discharged from said combustor;
a recuperator for exchanging heat between the air supplied from said air compressor to said combustor and an exhaust gas discharged from said turbine;
a first fuel supply device operable to supply a fuel having a large heating value to said combustor;
a second fuel supply device operable to supply a gas having a lower heating value smaller than the fuel to said combustor; and
a fuel controller operable to adjust amounts of the fuel and the gas to be supplied,
wherein said fuel controller is configured to switch a fuel to be supplied to said combustor from the fuel having a large heating value to the gas having a lower heating value when it is determined that said recuperator is heated to a predetermined temperature based on the temperature of the air compressed by said air compressor or the exhaust gas discharged from the turbine, and
wherein said first fuel supply device and said second fuel supply device are coupled separately to said fuel manifold of said combustor.

19. The gas turbine apparatus as recited in claim 18, wherein the gas comprises at least one of a digestion gas produced in a digestion process of biomass and a pyrolysis gas produced in a gasification process of biomass.

20. The gas turbine apparatus as recited in claim 18, wherein the fuel comprises at least one of a natural gas, a liquefied petroleum gas, a propane gas, kerosene, and light oil.

21. A gas turbine power generating system comprising:
a gas turbine apparatus including:
an air compressor for compressing air,
a combustor capable of combusting the air compressed by said air compressor,
a turbine rotatable by a gas discharged from said combustor,
a recuperator for exchanging heat between the air supplied from said air compressor to said combustor and an exhaust gas discharged from said turbine,
a first fuel supply device operable to supply a fuel having a large heating value to said combustor,
a second fuel supply device operable to supply a gas having a lower heating value smaller than the fuel to said combustor, and
a switching device operable to switch a fuel to be supplied to said combustor from the fuel having a large heating value to the gas having a lower heating value by switching said first fuel supply device and said second fuel supply device, wherein a switching operation of said switching device is performed when it is determined that said recuperator is heated to a predetermined temperature based on a temperature of the air compressed by said air compressor or the exhaust gas discharged from said turbine; and
a power generating apparatus for generating electric power with use of high-speed rotation of said turbine in said gas turbine apparatus.

22. The gas turbine power generating system as recited in claim 21, wherein said power generating apparatus comprises:
a permanent magnet power generator coupled to said turbine in said gas turbine apparatus;
a converter for converting a high-frequency AC output of said permanent magnet power generator into a DC output; and
an inverter for converting the DC output into an AC output having a predetermined frequency and a predetermined voltage and outputting the AC output.

23. A gas turbine power generating system comprising:
a gas turbine apparatus including:
- an air compressor for compressing air,
- a combustor capable of combusting the air compressed by said air compressor, said combustor including a fuel manifold,
- a turbine rotatable by a gas discharged from said combustor,
- a recuperator for exchanging heat between the air supplied from said air compressor to said combustor and an exhaust gas discharged from said turbine,
- a first fuel supply device operable to supply a fuel having a large heating value to said combustor,
- a second fuel supply device operable to supply a gas having a lower heating value smaller than the fuel to said combustor, and
a fuel controller operable to adjust amounts of the fuel and the gas to be supplied,
- wherein said fuel controller is configured to switch a fuel to be supplied to said combustor from the fuel having a large heating value to the gas having a lower heating value when it is determined that said recuperator is heated to a predetermined temperature based on the temperature of the air compressed by said air compressor or the exhaust gas discharged from the turbine, and wherein said first fuel supply device and said second fuel supply device are coupled separately to said fuel manifold of said combustor; and
a power generating apparatus for generating electric power with use of high-speed rotation of said turbine in said gas turbine apparatus.

24. The gas turbine power generating system as recited in claim 23, wherein said power generating apparatus comprises:
- a permanent magnet power generator coupled to said turbine in said gas turbine apparatus;
- a converter for converting a high-frequency AC output of said permanent magnet power generator into a DC output; and
- an inverter for converting the DC output into an AC output having a predetermined frequency and a predetermined voltage and outputting the AC output.

* * * * *